United States Patent Office 2,999,663
Patented Sept. 12, 1961

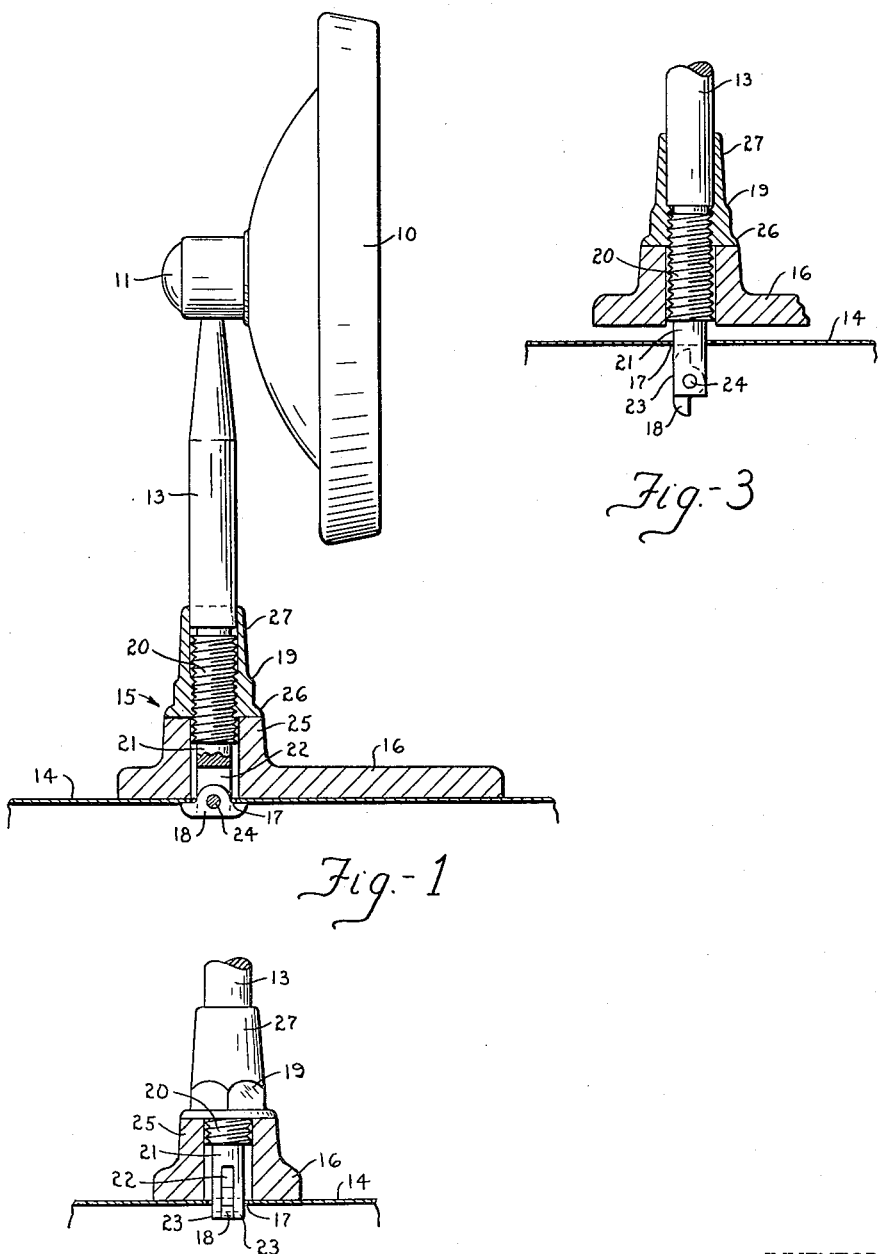

2,999,663
VEHICLE MIRROR MOUNTING STRUCTURE
John W. Anderson, 578 Broadway, Gary, Ind.
Filed Dec. 18, 1958, Ser. No. 781,388
6 Claims. (Cl. 248—220.5)

This invention relates generally to improvements in a mounting structure, and more particularly to improvements in a structure for mounting a device on a sheet-like member.

It is an object of this invention to provide a mounting structure including an attaching portion insertable through an opening provided in a selected area in a surface and which can be brought into clamping engagement with the surface by manipulation from one side of the surface only.

Another object of this invention is to provide a mounting structure of simple, sturdy design, involving a minimum number of parts.

A further object of this invention is to provide a single model of mounting structure which can be readily installed on either side of a motor vehicle or the like.

A still further object of this invention is to provide a mounting structure having the afore-mentioned attributes and which is neat in appearance.

Other and further objects and advantages of my invention will become apparent from the following description when considered in connection with the accompanying drawings in which:

FIGURE 1 is a plan view of the invention as applied to the body of a motor vehicle, with a portion of the mounting structure and vehicle body shown in section;

FIGURE 2 is a detail of the mounting structure taken at a right angle to FIGURE 1; and FIGURE 3 is a detail showing the first step in installing the mounting structure on a vehicle body or panel.

Referring more particularly to the drawings, wherein similar reference numerals refer to similar parts throughout the several views, and specifically to FIGURE 1, numeral 10 designates a mirror mounted at 11 in any conventional way upon the outer end of cylindrical post or arm 13 for limited universal adjustment. Arm 13 in turn is securely attached to panel 14 of a vehicle body by means of the mounting structure 15 of this invention. In general, the mounting structure includes a toggle bolt arrangement formed on the inner end of arm 13, which bolt portion passes through an escutcheon or thrust plate 16 and an opening 17 formed in the vehicle body, the toggle 18 being drawn into clamping engagement with the inner wall of the vehicle body by hexagonal nut 19.

In more detail, a portion 20 adjacent the inner end of arm 13 is threaded, while the extreme inner end portion 21 of the arm is unthreaded and of reduced diameter to permit application of nut 19 to said threaded portion. Reduced portion 21 is slotted at 22 to provide bifurcations 23. A pivot pin 24 extends between the bifurcations for pivotally supporting the toggle 18 between said bifurcations 23. As shown in FIGURE 3, the toggle may pivot to a position within the circumferential confines of reduced portion 21 for the purpose of provisionally applying nut 19 and escutcheon plate 16, as well as for inserting the toggle through the opening 17 formed in the vehicle body. Toggle 18 is designed so that when pin 24 is in a substantially horizontal position, the toggle will swing by gravity to a position transversely of arm 13, as shown in FIGURE 1. This may be accomplished in any conventional manner, such as by locating the pivot of the toggle somewhat beyond its center or by lightening one end thereof by notching the same.

Escutcheon plate 16 is formed with a tubular boss 25 for passage of the bolt portion of the arm 13 therethrough. Boss 25 terminates in a planar upper end for tight contact with the lower face of nut 19, and the lower edge of nut 19 is formed with a flange 26 merging with the upper periphery of boss 25 to present an appearance of continuity. The upper face of nut 19 is formed with an integral skirt or sleeve portion 27 snugly fitting arm 13 for concealing the threaded portion 20 when the nut is turned down from the starting position of FIGURE 3 to the final clamping position of FIGURE 1.

Plate 16 serves the dual purpose of an escutcheon and a thrust plate. In the latter capacity it reacts against the outer surface of panel 14 in opposition to the force applied to toggle 18, distributing said reactive force, as well as any lateral thrust or blow that may be applied to arm 13, over a relatively large area of panel 14. In the event the mirror is to be attached to a sharply curved panel, the bottom of plate 16 should be correspondingly shaped. It has been found, however, that for most installations a narrow, elongated plate having a flat bottom will make snug all around contact with the panel when the narrow dimension of the plate is arranged transverse the arc of curvature of the panel. The configuration of plate 16 may be varied for ornament and to reflect the motif of the vehicle design, such as by employing the shape of a tear drop, oval, diamond, or the like.

To install the mirror, it is first necessary to form an opening in the vehicle body or panel at the spot where the mirror is to be located. Then, with nut 19 turned well upward on threads 20, plate 16 in place, and arm 13 held with pin 24 substantially vertical as shown in FIGURE 2, the toggle end of the arm is inserted through opening 17, whereupon the arm is tilted a few degrees to permit the toggle to swing transversely to the arm as shown in FIGURE 1. Nut 19 may then be screwed down toward boss 25 of plate 16. Before the toggle begins to grip the inner side of panel 14, arm 13 should be rotated about its axis to basically position the mirror as desired. Arm 13 may be held by hand at the latter point while a wrench is applied to nut 19 for the final tightening. Manifestly the foregoing installation can be accomplished from the outside of the motor vehicle, thus avoiding removal of interior coverings or from reaching up under a filthy fender. Likewise it is apparent that, save for forming the opening in the body, the only tool required for the installation is a wrench or pliers.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A rear view mirror mounting structure comprising an arm having means at one end for supporting a mirror for limited angular adjustment, the opposite end of said arm being cylindrical and including an unthreaded terminal portion of reduced diameter, a toggle pivotally mounted on said terminal portion, a portion of the arm adjacent said unthreaded terminal portion being threaded, a nut engaging said threaded portion and movable upon rotation toward said toggle, the outer face of said nut being formed with a sleeve snugly fitting said arm and concealing said threads when the nut is turned to clamping position.

2. A rear view mirror mounting structure comprising an arm having means at one end for supporting a mirror for limited angular adjustment, the opposite end of said arm being cylindrical and including an unthreaded terminal portion of reduced diameter, a toggle pivotally mounted on said terminal portion, a portion of the arm adjacent said unthreaded terminal portion being threaded, a nut in engagement with said threaded portion and movable upon rotation toward said toggle, the outer face of said nut being formed with a sleeve snugly fitting said arm and concealing said threads when the nut is turned to clamping position, and an escutcheon plate disposed between said nut and toggle.

3. The apparatus as defined in claim 2 wherein said escutcheon plate includes a tubular boss receiving the terminal portion of said arm, the end of said boss being flat for even contact with the inner face of said nut.

4. The apparatus as defined in claim 3 wherein the lower edge of said nut is formed with a flange merging with the periphery of the upper end of said boss.

5. A rear view mirror mounting structure comprising an arm having means at one end for supporting a mirror for limited universal adjustment, the opposite end of said arm being cylindrical and including an unthreaded terminal portion of reduced diameter, said terminal portions being bifurcated, a toggle pivotally mounted between said bifurcations, a portion of said arm adjacent said unthreaded reduced terminal portion being threaded, a nut engaged with said threaded portion and movable upon rotation toward said toggle, an escutcheon plate having a tubular boss receiving said terminal portion of the arm, the upper end of said boss being flat for even contact with the inner face of said nut, the inner edge of said nut being formed with a flange for merging with the periphery of said boss, and the outer face of said nut being formed with a sleeve portion snugly fitting said arm and concealing said threads when the nut is turned to clamping position.

6. A rear view mirror mounting structure comprising an arm having means at one end for supporting a mirror for limited universal adjustment, the opposite end of said arm being cylindrical and including an unthreaded terminal portion of reduced diameter, said terminal portions being bifurcated, a toggle pivotally mounted between said bifurcations, a portion of said arm adjacent said unthreaded reduced terminal portion being threaded, a nut engaged with said threaded portion and movable upon rotation toward said toggle, an escutcheon plate having an elongate base portion engageable with a panel of a vehicle body and extending generally in the direction said mirror normally faces and having a tubular boss receiving said terminal portion of the arm, the upper end of said boss being flat for even contact with the inner face of said nut, the inner edge of said nut being formed with a flange for merging with the periphery of said boss, and the outer face of said nut being formed with a sleeve portion snugly fitting said arm and concealing said threads when the nut is turned to clamping position.

References Cited in the file of this patent

UNITED STATES PATENTS

| 450,127 | Wrigley | Apr. 7, 1891 |
| 2,079,881 | Smulski | May 11, 1937 |
| 2,321,861 | Sauer | June 15, 1943 |

FOREIGN PATENTS

| 10,046 | Great Britain | 1893 |